United States Patent [19]
Greenwood

[11] Patent Number: 5,521,819
[45] Date of Patent: May 28, 1996

[54] CONTROL SYSTEMS FOR DRIVELINES INCLUDING CONTINUOUSLY-VARIABLE-RATIO TRANSMISSIONS

[75] Inventor: Christopher J. Greenwood, Preston, England

[73] Assignee: British Technology Group Limited, London, England

[21] Appl. No.: 313,060

[22] Filed: Sep. 29, 1994

[30] Foreign Application Priority Data

Apr. 16, 1992 [GB] United Kingdom .................. 9208363

[51] Int. Cl.$^6$ .................................................. B60K 41/22
[52] U.S. Cl. ........................... 364/424.1; 477/43; 477/50; 477/110
[58] Field of Search ........................... 364/424.1, 431.03, 364/431.06; 477/43, 36, 46, 48, 49, 107; 192/0.032, 4 R, 9

[56] References Cited

U.S. PATENT DOCUMENTS

| | | | |
|---|---|---|---|
| 4,458,318 | 7/1984 | Smit et al. | 364/424.1 |
| 4,458,560 | 7/1984 | Frank et al. | 477/39 |
| 4,735,112 | 4/1988 | Osanai et al. | 477/43 |
| 4,982,822 | 1/1991 | Petzold et al. | 192/3.58 |
| 5,047,937 | 9/1991 | Vahabzadel et al. | 364/424.1 |
| 5,062,050 | 10/1991 | Petzold et al. | 364/424.1 |

FOREIGN PATENT DOCUMENTS

| | | |
|---|---|---|
| 0095173 | 11/1983 | European Pat. Off. . |
| 0352110 | 1/1990 | European Pat. Off. . |
| 2720950 | 11/1978 | Germany . |
| 1078791 | 8/1967 | United Kingdom . |
| 90/05860 | 5/1990 | WIPO . |
| 91/08405 | 6/1991 | WIPO . |

*Primary Examiner*—Kevin J. Teska
*Assistant Examiner*—Tan Nguyen
*Attorney, Agent, or Firm*—Davis, Bujold & Streck

[57] ABSTRACT

A vehicle driveline including a control system subject to operator demand, and a continuously-variable-ratio transmission including a variator of the torque-controlled type in which the control system includes a performance "map" of optimum relationships between engine torque and speed over a range of values of those two quantities, and in which the control system regulates both the energy input to an engine and also the reaction torque at the variator so as to seek a state in which the mapped optimum relationship between engine torque and speed is maintained. The variator may be of the toroidal-race rolling-traction type, reaction torque within it being regulated by controlling the operating force applied to the variator rollers. The control system may act so as to compute the variator reaction torque with relation to two alternative calculations based on the transmission input and output torques, respectively, and may choose for operation, at any given time, the calculation yielding the lesser value of that variator reaction torque.

5 Claims, 5 Drawing Sheets

CONTROL SYSTEMS FOR DRIVELINES INCLUDING CONTINUOUSLY-VARIABLE-RATIO TRANSMISSIONS

This invention relates to control systems for drivelines including continuously-variable-ratio transmissions (CVT's). By a driveline I mean a combination of components comprising in sequence a prime mover or other engine, the CVT, and a driven output connectable to a point of use. The invention applies especially but not exclusively to drivelines for automotive vehicles, in which the output will be connected directly or indirectly to driven wheels of the vehicle. More particularly, it can apply to drivelines in which the CVT includes a variator—that is to say a ratio-varying component—of torque-controlled type, especially one where the variator is of the toroidal-race rolling-traction type and the torque transmitted by the rollers is controlled by an operating force generated by hydraulic pressure, applied to a piston or like operating member to which each such roller is connected. Examples of such variators are described, for instance, in Patent publication WO90/05860.

BACKGROUND OF THE INVENTION

In a contemporary vehicle driveline including a variator of the toroidal-race rolling-traction type, the key component can be expected to be a computerised control system, programmed to receive inputs of two kinds. The first such input is the drivers demand, typically for engine power and typically communicated by way of the throttle pedal. The second such input comprises a multiplicity of electronic signals, of both command and responsive type. The essential command signal will be an input representing an engine "map", that is to say a desired and programmed relationship ("control line") of engine output torque ($T_E$) and engine output speed ($N_E$), over the effective working range of the engine. Thus engine power (T) can be inferred from either torque ($T_E$) or speed ($N_E$) values for operation on the control line. The "responsive" input signals continuously supply the control system with the instantaneous values of quantities such as the actual value of $N_E$, the actual speed $N_O$ delivered by the CVT output to the driven wheels or other point of use, and the reaction torque $T_R$ being transmitted across the variator. Appropriate processing of these inputs, by means well known in the art, enable the control system to compute other key measurements including the instantaneous ratio R being transmitted by the variator, $T_E$ and the instantaneous torque $T_O$ at the CVT output. In practice the control system will also receive further inputs relating for instance to efficiency factors and many other quantities.

The result of the many input signals, of these two kinds, that the control system receives, will in practice be only two essential output signals. One of these will be used to control the fuel supply to the engine, and the other to control the transmission.

SUMMARY OF THE INVENTION

The object of this invention is generally to improve a driveline of such type, and In particular to promote two improvements. Firstly, to operate the control system when the driver's demand changes so as to effect a smooth and rapid change from one steady state—that is to say, one steady relationship of $N_E$ to $T_E$ according to the operative engine "map"—to another when demanded by the operator. Secondly, to translate the driver's demand into either a demand for a transmission output torque (over the lower part of the transmission ratio range) or a demand for an engine power i.e. torque and speed (over the higher part of the range) and to effect an automatic and imperceptible transition between the two modes of operation of the control system.

BRIEF DESCRIPTION OF THE DRAWING

The invention is defined by the claims, the contents of which are to be read as included within the disclosure of the specification, and embodiments of the invention will now be described by way of example with reference to the accompanying drawings in which:

DESCRIPTION OF THE PREFERRED EMBODIMENTS

Figure 1:
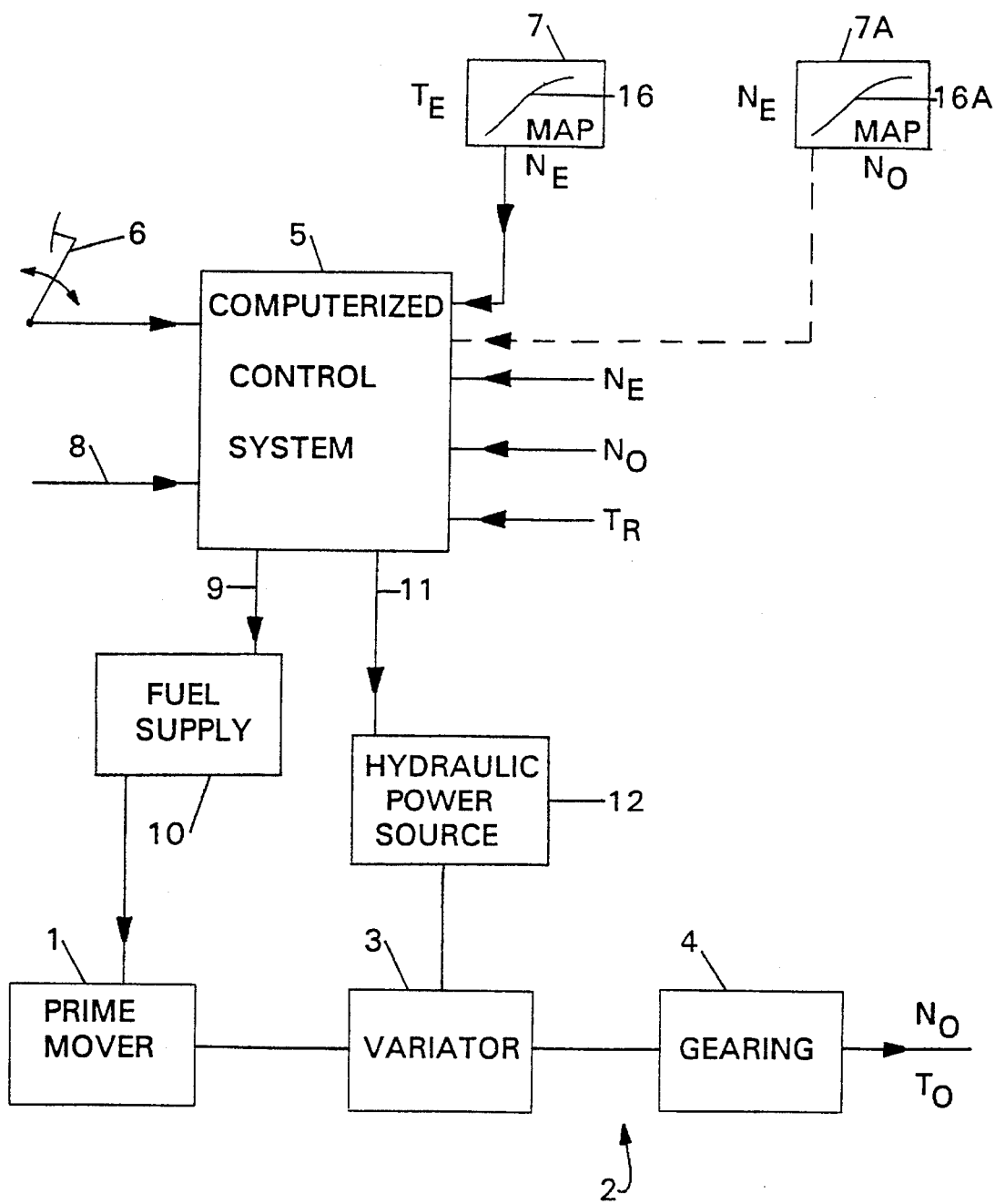
FIG. 1 is an overall diagram showing the interrelationship of the control system, the engine and the CVT.

The schematic diagram of FIG. 1 shows the essential components of a driveline according to the present invention: a prime mover 1 or other engine, a continuously-variable-ratio transmission 2 comprising a variator 3 and associated gearing 4, and a computerised control system 5 responsive to an input of operator demand supplied by way of an accelerator pedal 6. As already summarised, control system 5 also receives an input signal from an engine "map" 7 which predicates a particular relationship of $T_E$ and $N_E$ over at least part of the operating range of the driveline. It will be appreciated that a driveline could have the facility to receive this input not just from one such map 7, but from a number of them, with the facility to move from one to the other on changing from one part of the operating range to another, or at the choice of the driver to change performance, for instance from sporty to fuel economy or vice versa. FIG. 1 also shows the control system receiving an input 8 representing an efficiency factor, and monitoring inputs representing the instantaneous values of engine speed $N_E$, CVT output speed $N_O$, and variator operating torque $T_R$, as already described: as is well understood in the art, variator torque reaction $T_R$ is the sum of the input and output torques of the variator.

At any engine speed $N_E$, the torque output $T_E$ will vary with the fuel supply, up to a maximum represented by the "full throttle" line on torque-speed graphs of the kind shown in FIGS. 2 to 5. Beneath this line, points may be defined which represent, for example, operation at the best fuel economy or lowest emissions. Connecting up the points gives a "control line" on which the engine should run to deliver power (that is, the product of N and T at any point on the line) under steady state conditions. This information is stored on the engine map 7.

By way of outputs, the control system 5 delivers two control signals. One such signal is applied by way of line 9 to the fuel supply 10 of the engine 1: increasing the fuel supply will increase the torque output of the engine, $T_E$, up to the full throttle limit. The other output signal is delivered by way of line 11 to the hydraulic power source 12 which delivers and controls the oil pressure within the variator 3.

Increasing the variator oil pressure will increase the torque load $T_E$, (see FIGS. 2–5) upon the engine. When $T_E$ and $T_E$, are equal, engine speed wt 11 remain constant.

Figure 2:
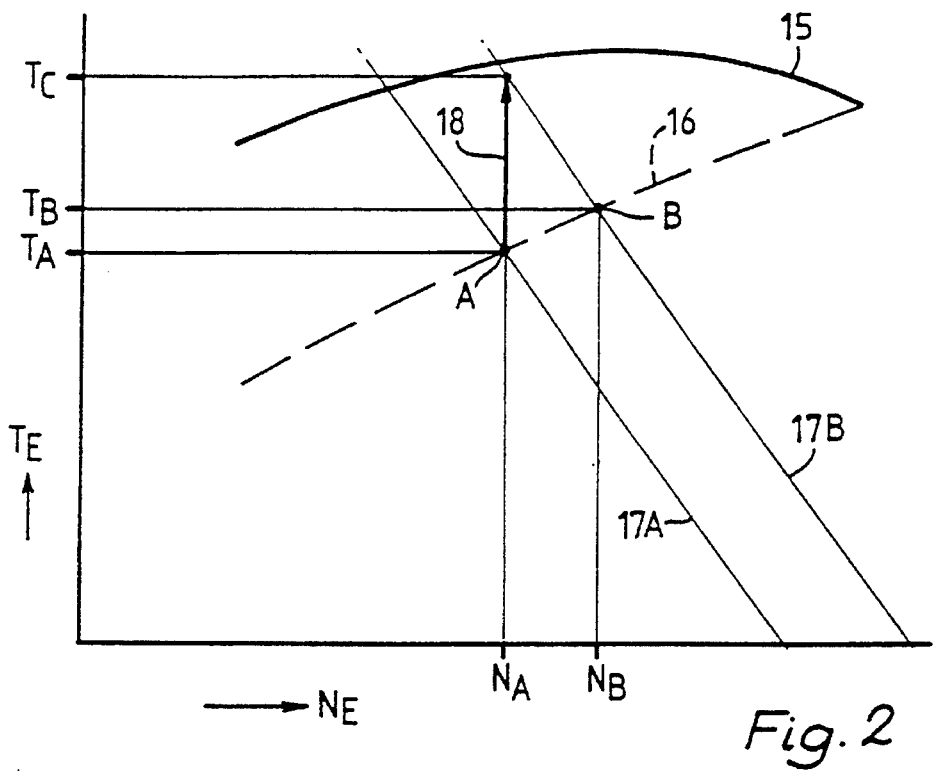
FIGS. 2 to 5 illustrate, graphically, the response of a control system to a change in operator demand, in a driveline according to one aspect of the invention.

FIGS. 2 to 5 illustrate one aspect of the present invention. FIG. 2 is a graphical representation of one engine map 7, on which the y-axis represents engine output torque $T_E$ and the x-axis engine speed $N_E$. Reference 15 indicates-the full throttle limit of the engine, and 16 the selected control line which is for the time being governing the performance of the engine. According to the invention, a feature of the control system which is built into the "map" is the series of parallel lines 17, each of which represents the amount by which engine output torque $T_E$ will be varied, by varying the fuel supply, for a given departure from the desired engine speed $N_E$. According to the invention. If $T_E$ and $N_E$ are as at point A and the operator depresses pedal 6 to demand that they rise to the values represented by point B, the system responds with a rapid rise (18) in fuel supply and consequent rapid rise in $T_E$ from $T_A$ (the value at point A) to $T_C$, a point lying on the sloping line 17B). As is evident from FIG. 2, the magnitude of the engine torque at point C is considerably greater than what is called for ($T_B$) at point B, the amount of the excess being set by the predetermined choice of the slope of the lines 17. The torque excess will start to accelerate the engine from speed $N_A$ at point A to the desired new speed $N_B$ at point B. However, according to invention, as the speed does rise from A to B the excess torque falls, from point C down line 17B, until $T_E$ and $N_E$ reach the demanded new equilibrium at point B.

Figure 3:
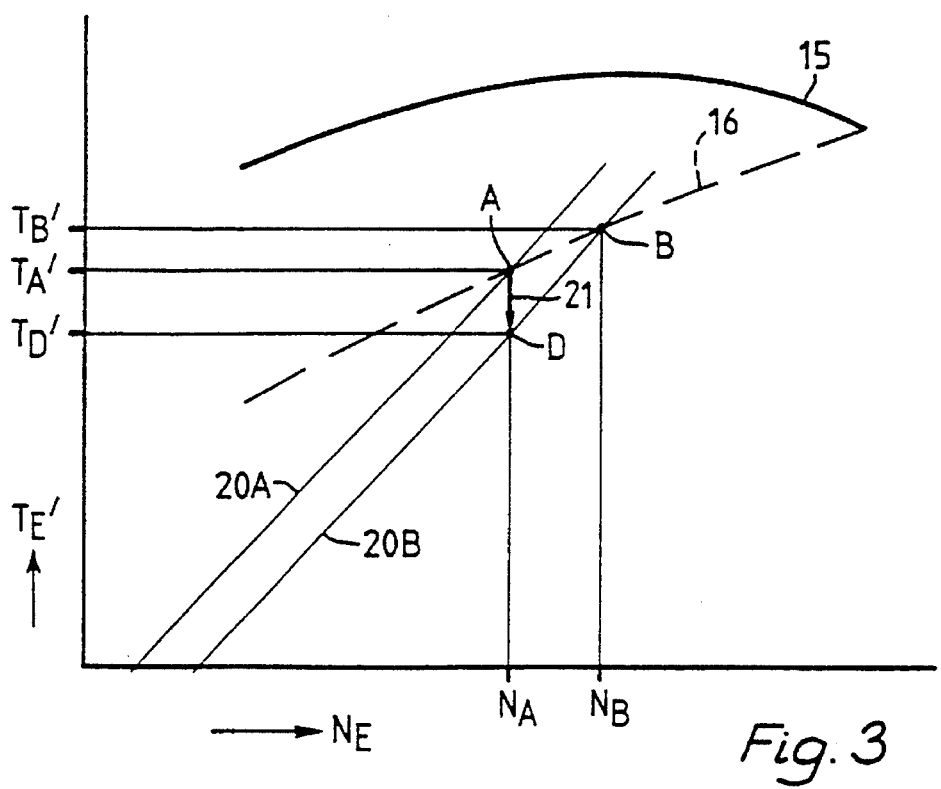

FIG. 2 represents the effect of one of the output signals (that delivered by way of line 9 in FIG. 1) of the control system 5 in response to operator demand. FIG. 3, in which the y-axis represents the load $T_E$, upon the engine rather than its output $T_E$, shows the effect according to the invention of the other output signal (delivered by way of line 11 in FIG. 1) of the control system in response to the same operator demand. In this figure full throttle line 15 and control line 16 are as before, but the sloping lines 20 represent the amount by which the torque load $T_E$, will be varied, by varying the hydraulic control pressure in the variator, for a given departure from the desired engine speed. An operator demand to move from point A to point B along control line 16 is now reflected in a quick reduction in variator oil pressure, as indicated by line 21, from the value at point A (on line 20A) to the value at point D on line 20B the locus which intersects point B. Thereafter, as speed rises, the torque load $T_E$, rises by moving from D to B along line 20B.

Figure 4:
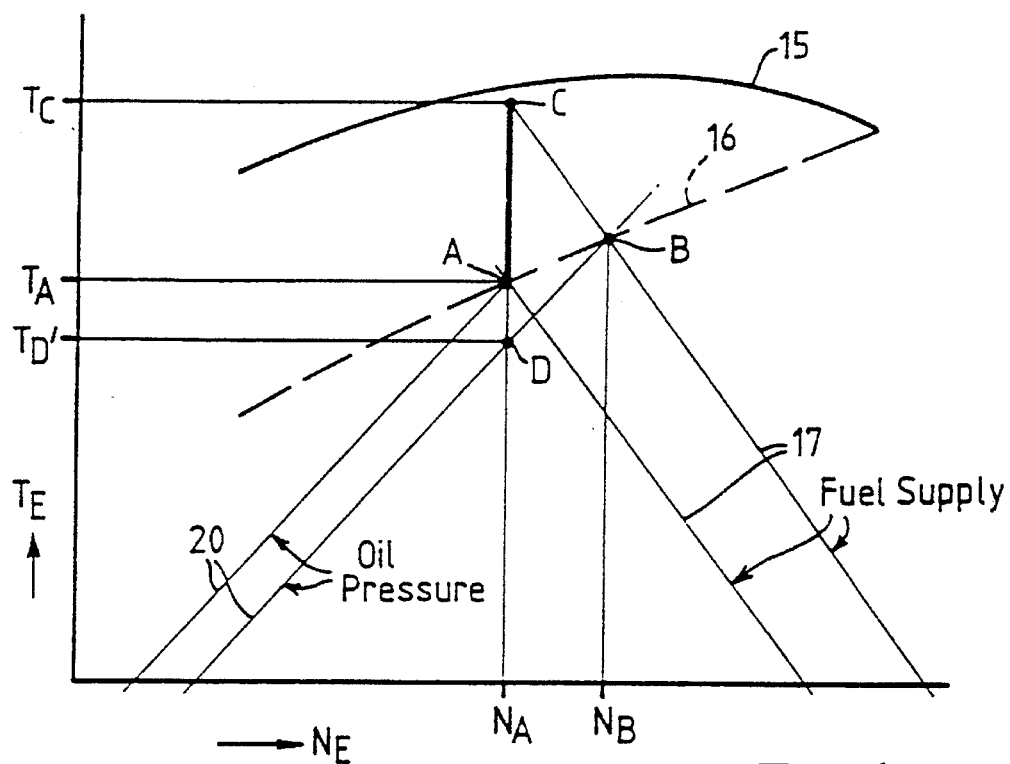
Figure 5:
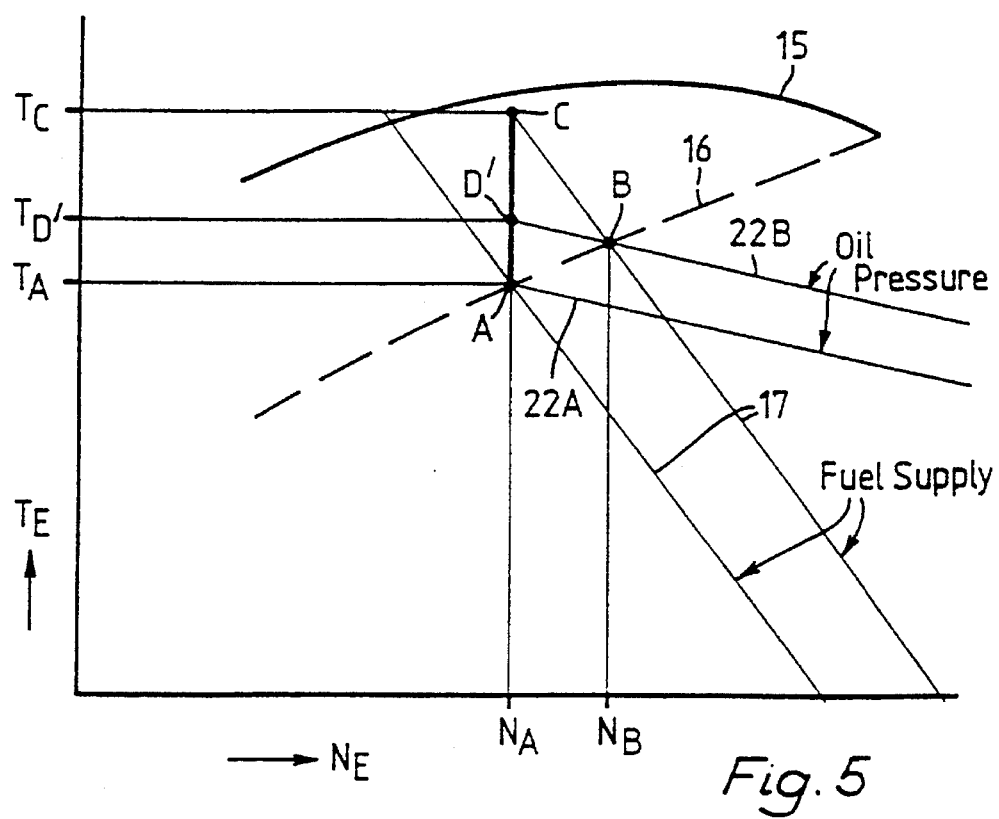

The graphs of FIGS. 2 and 3 can be combined, as in FIG. 4, to give a useful indication of the overall response of the driveline to both the outputs (lines 9 and 11, FIG. 1) of the control system 5 in response to an operator demand. FIG. 3 shows clearly that the quick reduction in torque represented by 21, resulting from the initial reduction in variator oil pressure, adds to the torque available to accelerate the engine. In effect that torque, represented by 18 in FIG. 2, has now been increased to DC (i.e. 21+18). However, the initial torque reduction 21 due to oil pressure drop will also reduce, initially at least, the torque on the driving wheels. Where this is undesirable, for instance because the combination of rising engine speed and falling output torque gives an impression of 'fussiness' and even of a lack of performance, the slope of the pressure control characteristic lines 20 may be reversed, at least relative to the local slope of the control line 16, as shown at 22 in FIG. 5. Now the excess torque output, $T_C - T_A$, is shared between accelerating the engine ($T_C - T_{D'}$), and providing additional torque ($T_{D'} - T_A$) through the transmission to the driving wheels. This reversed characteristic may be of most value when the gap between the control line 16 and the full throttle line 15 is large, typically in the middle of the engine speed range in petrol engines. It will be apparent that the slope of lines governing the oil pressure can be varied across the full range of engine speed $N_E$ from "reversed" (as-shown at 22 in FIG. 5) at medium speed to "normal" (as shown at 20 in FIGS. 3 and 4) at higher speeds. It will be apparent that for stability the slope of the reversed pressure control lines 22 must be less than the local slope of the fuel supply control lines 17.

The choice of the slope of the fuel supply and oil pressure characteristics 17 and 20, 22, and of the control line 16 and its relationship to the full throttle line 15, will determine the "feel" of the driveline under transient conditions.

In summary, in a driveline exemplifying this aspect of the invention, we may have, the following sequence:

1. A driver demand, through the accelerator pedal, for engine power;
2. at least one engine "map" giving the desired engine speed, $N_E$, and engine torque, $T_E$, to produce the engine power thus demanded;
3. one closed loop control system which compares the actual with the desired engine speed and varies the fuel supply to bring the two into agreement, and
4. a second closed loop control system which compares the desired engine (output) torque with the torque load on the engine (computed from the variator ratio and torque reaction), and varies the variator operating force (control pressure) to bring the two into agreement.

A second aspect of the present invention relates particularly to the programming of the control system 5 to provide the second of its outputs, in line 11, to regulate the control pressure of the variator 2. This aspect of the invention applies to a driveline including any torque-controlled variator, but especially one where the variator is of the toroidal-race rolling-traction type, where the traction forces on the rollers are proportional to the control forces applied to the rollers, and determine the input and output torques of the variator. In a practical vehicle transmission there will be a maximum transmission output torque which can safely be applied to the driving wheels and a maximum engine output torque, say $T_{OM}$ and $T_{EM}$ respectively. If the lowest (speed) ratio of the transmission, ($N_O/N_E$), is less than $T_{EM}/T_{OM}$ (i.e. the torque magnification is greater than $T_{OM}/T_{EM}$), then means must be found to reduce $T_E$ below $T_{EM}$ so that $T_O$ does not exceed $T_{OM}$—the maximum permissible output torque.

This problem can occur with any transmission having a sufficiently wide ratio range and is unavoidable in a two-regime system (of the kind about to be described) in which the speed ratio R, reaches zero—a theoretically infinite torque multiplication.

Thus the,control system must interpret driver demand in two different ways: over a lower part of the ratio range it must produce a desired level of transmission output torque and, over the higher part of the range a desired level of engine torque (or power). The transition between these two control modes must be automatic and undetectable. According to this aspect of the invention the control algorithms within control system 5 contain equations that continuously calculate and compare the variator torque reaction ($T_R$, proportional to control pressure) which would result were the driver demand to be interpreted as a proportion of maximum engine torque on the one hand and as a proportion of maximum transmission output torque on the other. The control pressure needed to give the lower of these two values of torque reaction is then chosen and applied. Operation within the two limits of maximum engine torque (power) and maximum transmission output torque is thus ensured.

This facility is of particular benefit in transmissions which use toroidal-race variators and in which the effective range of ratios which the variator can provide is enhanced by making the transmission capable of operating in two different modes or "regimes". Such transmissions, which an early example is found in Patent Specification GB-A-1078791 and a more recent one in published International Specification WO 91/08406, comprise one or more gear units in addition to the variator. Typically there are two such units, of which the first has a speed-reduction capability and is usually Known as the "reducer", while the output of the second (epicyclic) unit—usually known as the "mixer"—is the output of the transmission as a whole, and its two other branches are connected to the variator and reducer respectively. Each of the units has a component capable of being engaged by a clutch, brake or the like. With the engaged component of the reducer held and that of the mixer free, traverse of the variator from one end of its ratio range to the other causes the output member of the mixer, all of whose branches transmit power, to progress continuously from maximum reverse speed, through a condition know as "geared neutral" in which the transmission output is stationary, and then to gather forward speed. During this process the transmission is said to be in "low" regime. The components and ratios of the two gear units are so chosen that the engaged component of the reducer may at the highest forward ratio in low regime be released and the corresponding component in the mixer engaged in its place, without any instantaneous change to the transmitted ratio: Such a change between regimes is known in the art as a "synchronous" change. The transmission is now said to be in "high" regime, and if the variator is now traversed back to the original end of its ratio range, the forward speed of the output member increases continuously.

FIGS. 6 to 9 show the variator V, reducer G and mixer epicyclic E of such a transmission diagrammatically, and by reference to some typical assumed quantities illustrate how the variator reaction torque $T_R$ may always be kept to the lesser of the two possible values by choosing $T_O$ as the basis for determining the variator control pressure in some conditions of the driveline, and $T_E$ in others. In FIGS. 6 to 9 the following typical quantities are assumed:

| | |
|---|---|
| Ratio R of variator V | from 0.5 to 2.0 |
| Ratio (annulus-to-sun) of mixer epicyclic E | 2 |
| Ratio of reducer G | 0.5 (and thus equal to the minimum value of R) |
| maximum value of $T_E$ | 1 unit of torque |
| maximum value of $T_O$ | 4 units of torque (arbitrary but typical magnification of $T_E$) |

It should also be noted that in FIGS. 6 to 9 reversals of rotation are ignored, except in calculating torques, that the arrows indicate the directions in which powers flow or circulate within the various sections of the driveline, and the figures indicate the values of those torques. The unbracketed figures are those that will exist if variator reaction torque $T_R$ is kept to the lesser of the two possible values, while the bracketed figures indicate the value that would exist if $T_R$ were instead allowed to assume the other value. It should also be noted that for the sake of simplicity, 100% efficiency is assumed.

On this assumption the two equations for calculating the torque reaction in the variator from engine torque $T_E$, and transmission output torque $T_O$, in low regime and at 100% efficiency, are:

1. $T_R = T_O \cdot (R+1)/E$
2. $T_R = T_E \cdot (R+1)/(GE+G-R)$

Figure 6:
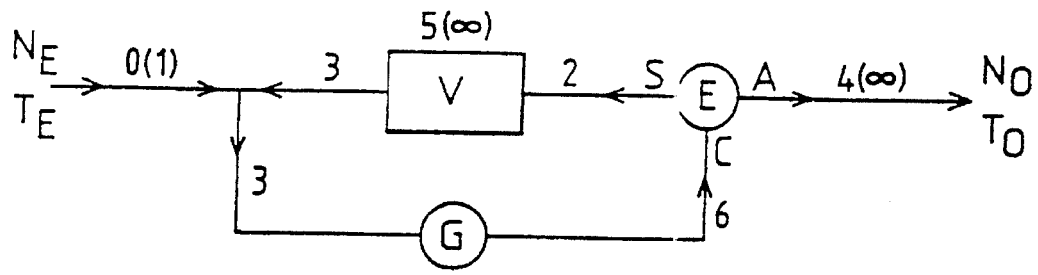
FIGS. 6 to 9 illustrate different operating conditions of a driveline according to a second aspect of the invention.
Figure 7:
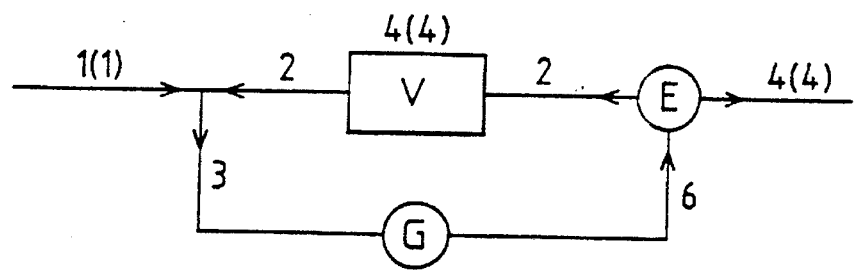
Figure 8:
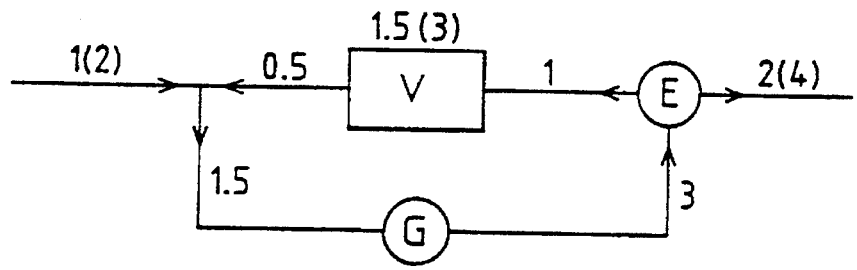
Figure 9:
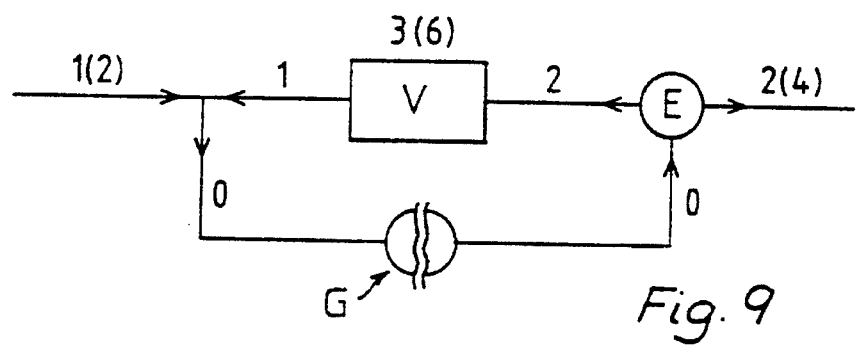

FIG. 6 shows the transmission at "geared neutral" the condition in low regime when $N_E$ has a finite but indeterminate value but $N_O$ is zero. In this situation the only sensible choice for controlling the oil pressure of variator V is the output torque (assumed at maximum value 4) giving a computed torque reaction within V of 5 (i.e. the sum of its input and output torques 2 and 3). Use of $T_E$ as the alternative means of control would yield very high values, tending to infinity, for both $T_R$ and $T_O$. FIG. 7 illustrates the condition of the transmission with variator ratio R=1 in low regime, where $T_E$ and $T_O$ both be at their maximum values of 1 and 4 respectively. Here, according to the invention, there is a choice as to whether control of the oil pressure within V is based upon $T_E$ or $T_O$: either way, $T_R=4$. FIG. 8 shows the transmission at the low ratio end (R=0.5) of low regime at which synchronous change to high regime takes place, and in which It may be assumed that $T_E$ will be at its maximum value 1 and that $T_O$ will, unless constrained, seek its own maximum value of 4. In this condition, as the Figure shows, choice of $T_E$ (=1) as the control for the oil pressure within V results in a value of 1.5 for $T_R$ whereas choice of $T_O$ (=4) as the control would cause $T_R$ to rise to 3 and also tend to cause $T_E$ to rise to 2, which is impossible: $T_E$ should therefore now be selected to control variator oil pressure. Finally, FIG. 9 shows the condition of the transmission while variator ratio R is still equal to 0.5, but synchronous change has taken place so that the transmission is now in high regime. The limb of the transmission including reducer epicyclic G is now disconnected, and two components are locked within mixer epicyclic E so that drive is transmitted directly from the sun (input) to the annulus (output). Here again $T_E$ (assumed=1) is the clear choice for controlling variator of pressure, yielding a value of 3 for $T_R$, compared with the value of 6 that would result if $T_O$ (assumed full value 4) were used as the basis for the control. As in FIG. 8, use of $T_O$ would again promote not only a higher value of $T_R$, but also imply an impossibly high value of $T_E$.

FIGS. 6 to 9 show that in the hypothetical transmission they represent, with its assumed values for certain ratios and for the maximum values of $T_E$ and $T_O$, according to the invention the variator oil pressure will be controlled by reference to the output torque value in the part of low regime including reverse motion, geared neutral and forward motion up to variator ratio R =1. Thereafter however the control should be related to input power. Output torque is thus seen to provide the control at low values of output speed ($N_O$) and input power at higher values. This reflects the fact that at or near zero output speed the demand for engine power is low, even at high output torques. Such power can be provided at only low engine speed ($N_E$), and allowing that speed to rise tends only to increase the power being recirculated (by way of reducer G) in the transmission. The control of engine speed under these conditions may call for an extra input. An example is shown at 7a in FIG. 1, and is an engine "map" on which a control line (16a) correlates engine speed $N_E$ and output speed $N_O$, compared with the correlation of $N_E$ and $T_E$ on map 7. When variator oil pressure is under the control of input torque $T_E$, the engine speed $N_E$ can be found from the control line 16 of map 7. When control is by $T_O$, an alternative map relating input speed directly to an output characteristic may be desirable.

However, by more sophisticated use of the information available from an item such as map 7, it may be possible for such a map to suffice at all times. As already described, variator torque reaction $T_R$ may be computed continuously according to demand—that is to say the pedal (6, FIG. 1) position—in terms both of output torque $T_O$ and input power $T_E$, and the lower of these two values continuously chosen to control the hydraulic pressure by which the variator is controlled. Knowledge of that chosen pressure (and thus of variator torque reaction $T_R$), of the variator ratio R, of which regime is in operation, of the output speed $N_O$ and of the transmission efficiency enables input power $T_E$ to be calculated even when the variator oil pressure is being controlled by output torque. Because efficiency is taken into account, input power $T_E$ is never zero, even at standstill in geared neutral. Provided input power $T_E$ can be calculated, as in the manner just described, a single engine map 7 based on the two quantities $N_E$ and $T_E$, can be used at all times to obtain the appropriate value of $N_E$, which the engine throttle will control.

Figure 10:
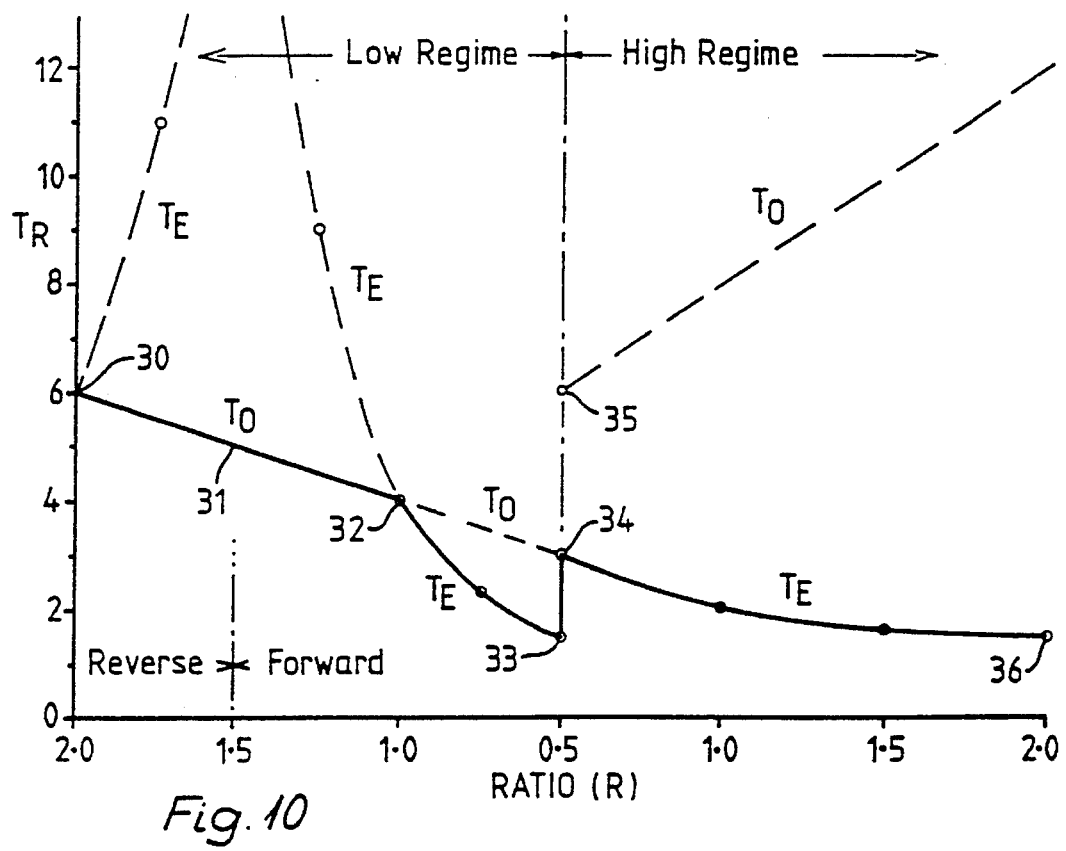
FIGS. 10 and 11 are graphs.
Figure 11:
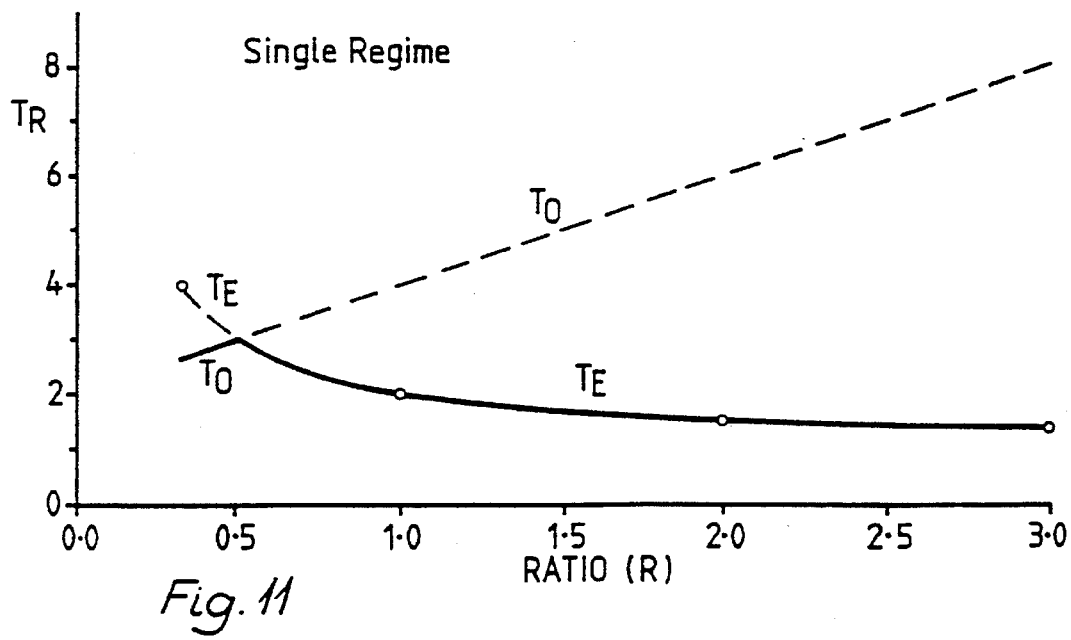

While FIGS. 6 to 9 show the transmission in four individual steady states, and indicate clearly which of the two relevant parameters—$T_E$ and $T_O$—should be chosen to control variator oil pressure In each of those four steady states, the graphs of FIGS. 10 and 11 present a continuous picture across the full working range of the transmission, indicating how control of $T_R$ might ideally pass back and forth between $T_E$ and $T_O$ across that range. In the graphs of FIG. 10 $T_R$ is plotted against variator ratio R across the full range of values of the latter quantity, from maximum ratio 2.0 to minimum ratio 0.5 in low regime, through a synchronous change to high regime at that value of R, and then rising through high regime back to the maximum of 2.0. In low regime the two equations for calculating the variator reaction torque $T_R$ from either engine torque $T_E$ or transmission output torque $T_O$, assuming 100% efficiency, are as already stated. In high regime the terms representing the ratios of the mixer epicyclic E and reducer G disappear but the equations are otherwise similar, namely 1. $T_R = T_O \cdot (R+1)$
2. $T_R = T_E \cdot (R+1)/R$.

In these Figures the full lines indicate the quantity—$T_O$ or $T_E$—which is chosen to control $T_R$ at any particular value of variator ratio R, and the broken lines indicate the other quantity which is not so chosen. It will also be apparent that the ordinate values applicable to variator torque reaction $T_R$ also apply to torques $T_O$ and $T_E$ throughout. FIG. 10 indicates clearly that at the maximum value 2.0 of variator ratio R (point) 30) in low regime, theoretically. $T_R$ could be controlled by either of $T_E$ or $T_O$. In fact it will be natural to choose $T_O$, because as ratio R then falls, $T_O$ is clearly to be preferred. At point 31 the transmission is in the condition shown in FIG. 6. At point 32 it is in the condition shown in FIG. 7, and control of $T_R$ passes to $T_E$. At point 33 the transmission is shown in the condition of FIG. 8, at the R=0.5 end of low regime but before synchronous change to high regime has taken place: at this point control by $T_E$ yields a value of 1.5 for $T_R$, whereas control by $T_O$ would yield a value of 3.0. The point 34 shows the transmission in the condition of FIG. 9: synchronous change has taken place, and variator ratio R is still 0.5 and therefore at its lowest high regime value. Here control by $T_E$ yields a value for $T_R$ of 3.0, whereas control by $T_O$ (point 35) would yield 6.0. As ratio R increases through high regime to a maximum value of 2.0, $T_E$ continues as the clear choice for controlling $T_R$, the value of which falls to 1.5 (point 36) at R=2.0.

Although the second aspect of the invention is of particular importance in two-regime transmissions, to which FIGS. 6 to 10 have related, it may also be beneficial in a simpler, single-regime transmission in which the variator input is connected to the output, and the variator output is connected by way of a starting clutch/reverse mechanism to the wheels or other driven mechanism. In FIG. 11 the ratio R of the variator in such a single-regime transmission is plotted against variator torque reaction just as it was in FIG. 10. In this Figure, however, two assumptions have been made that are customary in single-range transmissions. Firstly that a wide-ratio-range variator (from 1:3 to 3:1) is used. Secondly that the variator could in theory deliver three times the maximum value of $T_E$, and that the maximum value of $T_O$ should be restricted to twice the maximum value of $T_E$. Having made those assumptions, FIG. 11 shows that full engine torque $T_E$ can be used to control $T_R$ over most of the ratio range of the variator. However at the extreme low end of the ratio range, below point 38 where R is 0.5 and $T_R$ is 3.0, control by $T_O$ is to be preferred.

I claim:

1. A driveline comprising a control system, subject to operator demand, and a continuously-variable-ratio transmission including a variator, said continuously-variable-ratio transmission being connected to receive an input from an engine and providing a transmission output;

a supply of fuel to the engine being variably regulatable by said control system, and an optimum relationship between engine torque and speed being predetermined over a range of values of engine torque and speed; and means for sensing and correlating an appropriate speed, torque and ratio of said continuously-variable-ratio transmission whereby said driveline seeks a state in which such an optimum operational relationship is achieved;

wherein said control system is operable to regulate a reaction torque experienced within said variator;

said control system includes a first closed-loop and a second closed-loop, each of said first and second closed-loops is responsive to operator demand, said first closed-loop correlates engine speed to engine output torque, and said second closed-loop relates a variator operating force to a torque load which said variator imposes on the engine; and said first closed-loop, in response to an operator demand for higher engine speed and thus an increase in the supply of fuel, causes a relatively rapid increase in engine torque until the supply of fuel reaches a value appropriate for the demanded speed, after which the torque decreases and the engine speed increases until both the torque and the engine speed attain values predicated by the optimum operational relationship.

2. A driveline according to claim 1, wherein said first and second closed-loops, in response to an operator demand for higher engine speed and thus an increase in the supply of fuel, modify the correlation of torque load and demanded speed whereby an initial rapid increase in engine torque resulting from operation of said first control loop is shared between increasing both engine torque and the torque load imposed upon the engine by said variator, following which the engine speed increases and the engine torque and the torque load both decrease until the engine speed, the engine torque and the torque load together attain the values predicted by the optimum operational relationship.

3. A driveline according to claim 1, wherein said continuously variable ratio transmission has a low operating regime and a high operating regime.

4. A driveline comprising a control system, subject to operator demand, and a continuously-variable-ratio transmission including a variator, said continuously-variable-ratio transmission being connectable to receive an input from an engine and providing a transmission output;

a supply of fuel to the engine being variably regulatable by said control system with optimum relationships between engine torque and speed being predetermined over a range of values of engine torque and speed; and means for sensing and correlating an appropriate speed, torque and ratio of said continuously-variable-ratio transmission whereby said driveline seeks a state in which such an optimum operational relationship is achieved;

wherein said control system is operable to regulate a reaction torque experienced within said variator;

said control system includes a first closed-loop and a second closed-loop with each of said first and second closed-loops responsive to operator demand, said first closed-loop correlates engine speed to engine output torque, and said second closed-loop relates a variator operating force to a torque load which said variator imposes on the engine; and said second closed-loop, in response to an operator demand for higher engine speed and thus an increase in the supply of fuel, causes a relatively rapid decrease in a torque load imposed upon the engine by said variator until the variator operating force reaches a value appropriate for the demanded speed, after which the torque load and the engine speed both increase until both the torque and the engine speed attain the values predicated by the optimum operational relationship.

5. A driveline according to claim 4, wherein said first and second closed-loops, in response to an operator demand for higher engine speed and thus an increase in the supply of fuel, modify the correlation of torque load and demanded speed whereby an initial rapid increase in engine torque resulting from operation of said first control loop is shared between increasing both engine torque and the torque load imposed upon the engine by said variator, following which the engine speed increases and the engine torque and the torque load both decrease until the engine speed, the engine torque and the torque load together attain the values predicted by the optimum operational relationship.

* * * * *

UNITED STATES PATENT AND TRADEMARK OFFICE
CERTIFICATE OF CORRECTION

PATENT NO. : 5,521,819
DATED : May 28, 1996
INVENTOR(S) : Christopher J. Greenwood It is certified that error appears in the above-identified patent and that said Letters Patent is hereby corrected as shown below:

On the title page:

[86] PCT No.: PCT/GB93/00763
                    §371 Date: Sept. 29, 1994
                    §102(e) Date: Sept. 29, 1994

[87] PCT Pub. No.: WO 93/21031
                    PCT Pub. Date: Oct. 28, 1993 section [22] replace with "[22] PCT Filed: Apr. 13, 1993"

Signed and Sealed this

Twenty-second Day of October, 1996

Attest:

BRUCE LEHMAN

*Attesting Officer*      *Commissioner of Patents and Trademarks*